United States Patent
Dabirmoghaddam et al.

(10) Patent No.: US 9,380,479 B2
(45) Date of Patent: Jun. 28, 2016

(54) WIRELESS MESH ACCESS NODE NEIGHBORING CHANNEL QUALITY ESTIMATION

(71) Applicants: Ali Dabirmoghaddam, Santa Cruz, CA (US); Amalavoyal Narasimha Chari, Menlo Park, CA (US); Wenge Ren, Sunnyvale, CA (US)

(72) Inventors: Ali Dabirmoghaddam, Santa Cruz, CA (US); Amalavoyal Narasimha Chari, Menlo Park, CA (US); Wenge Ren, Sunnyvale, CA (US)

(73) Assignee: ABB Inc., Cary, NC (US)

( * ) Notice: Subject to any disclaimer, the term of this patent is extended or adjusted under 35 U.S.C. 154(b) by 60 days.

(21) Appl. No.: 14/268,919

(22) Filed: May 2, 2014

(65) Prior Publication Data

US 2015/0319629 A1 Nov. 5, 2015

(51) Int. Cl.
*H04W 24/08* (2009.01)
*H04W 28/04* (2009.01)
*H04W 84/18* (2009.01)

(52) U.S. Cl.
CPC .............. *H04W 24/08* (2013.01); *H04W 28/04* (2013.01); *H04W 84/18* (2013.01)

(58) Field of Classification Search
CPC ..... H04W 72/04; H04W 72/0453; H04Q 7/00
See application file for complete search history.

(56) References Cited

U.S. PATENT DOCUMENTS

| | | | |
|---|---|---|---|
| 5,287,544 A * | 2/1994 | Menich et al. | 455/450 |
| 6,965,575 B2 | 11/2005 | Srikrishna et al. | |
| 7,489,932 B2 | 2/2009 | Chari et al. | |
| 7,551,562 B2 | 6/2009 | Srikrishna et al. | |
| 7,689,224 B2 | 3/2010 | Chari et al. | |
| 7,769,040 B2 | 8/2010 | Srikrishna et al. | |
| 8,054,784 B2 | 11/2011 | Ren et al. | |
| 8,055,759 B2 | 11/2011 | Gupta et al. | |
| 8,248,948 B2 | 8/2012 | Weil et al. | |
| 8,306,041 B2 | 11/2012 | Srikrishna et al. | |
| 8,493,945 B2 | 7/2013 | Behroozi et al. | |
| 8,559,407 B2 | 10/2013 | Weil et al. | |
| 2002/0136268 A1 * | 9/2002 | Gan et al. | 375/133 |
| 2008/0159210 A1 * | 7/2008 | Zaks et al. | 370/329 |
| 2011/0013092 A1 * | 1/2011 | Chung et al. | 348/732 |
| 2013/0258950 A1 | 10/2013 | Behroozi et al. | |
| 2013/0281144 A1 * | 10/2013 | Chang et al. | 455/509 |
| 2014/0029516 A1 * | 1/2014 | Heo et al. | 370/328 |

* cited by examiner

*Primary Examiner* — Albert T Chou
(74) *Attorney, Agent, or Firm* — Brian R. Short

(57) ABSTRACT

A controller of a wireless access node is operative to estimate an adjacent one of a plurality of wireless channels while the access node is communicating over a present one of the plurality of wireless channels, comprising the controller, determining a difference between a measured signal quality of a signal communicated over the present wireless channel and a measured signal quality of a signal communicated over the adjacent channel, estimate a difference between a packet success rate of the present channel and a packet success rate of the adjacent channel based on the determined difference, and estimating a packet success rate of the adjacent channel based on a packet success rate of the present channel and the estimated difference between the packet success rate of the present channel and the packet success rate of the adjacent channel.

20 Claims, 5 Drawing Sheets

# WIRELESS MESH ACCESS NODE NEIGHBORING CHANNEL QUALITY ESTIMATION

FIELD OF THE DESCRIBED EMBODIMENTS

The described embodiments relate generally to wireless communications. More particularly, the described embodiments relate to systems, methods and apparatuses for estimating a quality of neighboring transmission channels of an access node.

BACKGROUND

Wireless mesh networks include access nodes that wirelessly communicate with each other. The access nodes typically communicate with each other over multiple wireless transmission channels.

Wireless mesh networks are subject to any number of possible interfering signals and transmission signal influencing conditions. Therefore, the management of the utilization of the transmission channels available to the wireless mesh network is important. However, when an access node of a wireless mesh network is presently communicating over a first transmission channel, evaluation of a second transmission channel can be difficult.

It is desirable to have methods, systems and apparatuses for estimating a quality of neighboring communication channels of an access node of a wireless mesh network.

SUMMARY

An embodiment includes an access node. The access node includes one or more transceivers operative to wirelessly communicate with one or more upstream access nodes or a gateway through one or more of a plurality of wireless channels, and a controller. The controller is operative to estimate an adjacent one of the plurality of wireless channels while the access node is communicating over a present one of the plurality of wireless channels, comprising the controller, determining a difference between a measured signal quality of a signal communicated over the present wireless channel and a measured signal quality of a signal communicated over the adjacent channel, estimate a difference between a packet success rate of the present channel and a packet success rate of the adjacent channel based on the determined difference, and estimating a packet success rate of the adjacent channel based on a packet success rate of the present channel and the estimated difference between the packet success rate of the present channel and the packet success rate of the adjacent channel.

Another embodiment includes a wireless mesh network. The wireless mesh network includes a gateway and a plurality of wireless access nodes, wherein each of the plurality of access nodes is operative to wirelessly communicate with one or more upstream access nodes or the gateway through one or more of a plurality of wireless channels. Each access node is operative to estimate an adjacent one of the plurality of wireless channels while the access node is communicating over a present one of the plurality of wireless channels, comprising the controller, determine a difference between a measured signal quality of a signal communicated over the present wireless channel and a measured signal quality of a signal communicated over the adjacent channel, estimate a difference between a packet success rate of the present channel and a packet success rate of the adjacent channel based on the determined difference, and estimate a packet success rate of the adjacent channel based on a packet success rate of the present channel and the estimated difference between the packet success rate of the present channel and the packet success rate of the adjacent channel.

Another embodiment includes a method of an access node estimating an adjacent one of the plurality of wireless channels while the access node is communicating over a present one of the plurality of wireless channels. The method includes determining a difference between a measured signal quality of a signal communicated over the present wireless channel and a measured signal quality of a signal communicated over the adjacent channel, estimating a difference between a packet success rate of the present channel and a packet success rate of the adjacent channel based on the determined difference, and estimating a packet success rate of the adjacent channel based on a packet success rate of the present channel and the estimated difference between the packet success rate of the present channel and the packet success rate of the adjacent channel.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide systems, methods and apparatuses for persistently monitoring and evaluating a quality of channels available to a wireless node of a wireless mesh network. If an adjacent channel is determined to be of better quality than a presently being used channel, then for an embodiment, the wireless node switches to the better quality channel. At least some embodiments utilize several factors in determining the quality of the adjacent channel.

Figure 1:
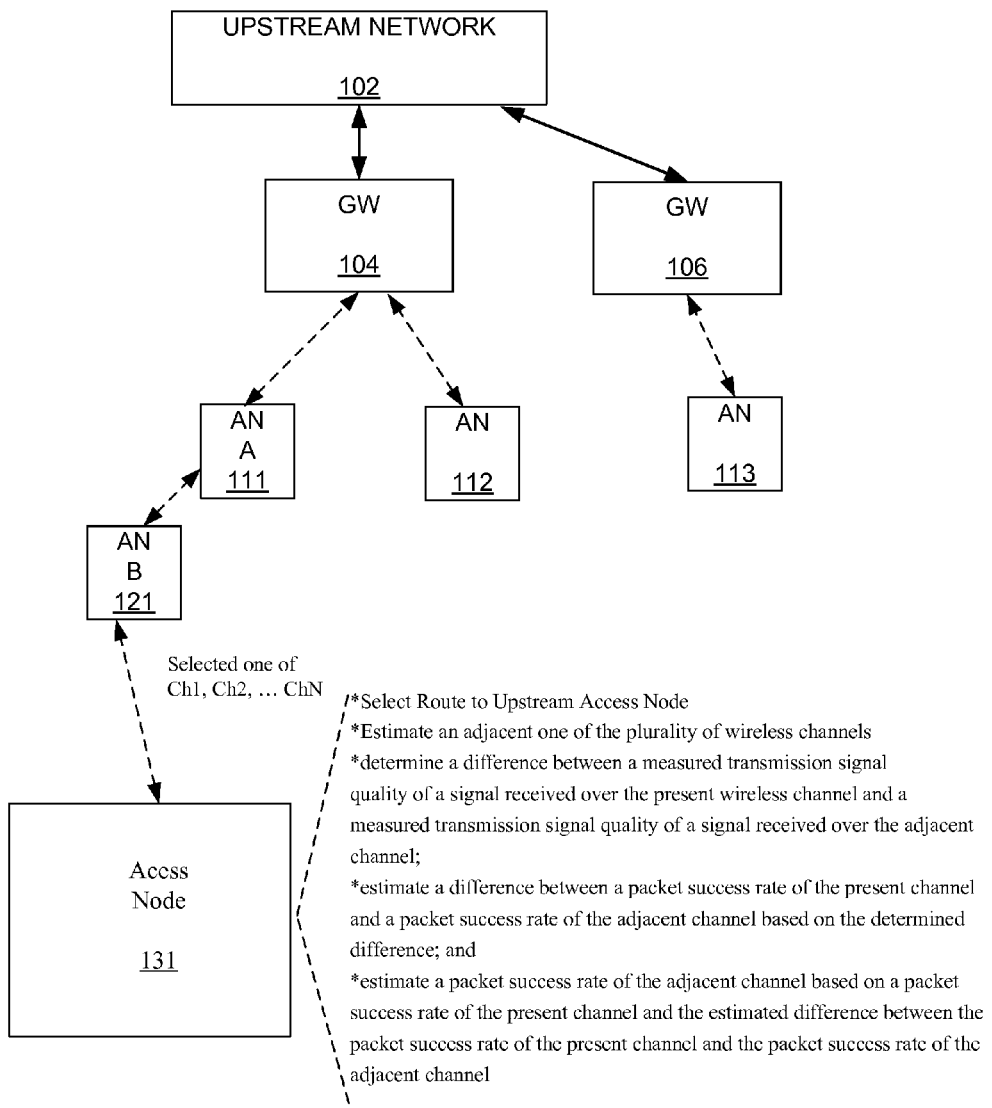
FIG. 1 shows a wireless network that includes a gateway, multiple access nodes, according to an embodiment.

FIG. 1 shows a wireless network that includes a gateway, multiple access nodes, according to an embodiment. As shown, an access node 131 is wirelessly connected through a selected one of N possible channels (Ch1, Ch2, ... ChN) to an upstream access node 121. Further, the upstream access node 121 is wirelessly connected to access node 111, which is wirelessly connected to upstream gateway 104. The gateway 104 is connected (either wired or wireless) to an upstream network 102. As shown, the gateway 104 also includes a downstream access node 112. Further, the wireless mesh network includes a gateway 106 that has a downstream access node 113. Clearly, the gateways and access nodes of FIG. 1 are merely one example of the nearly infinite number of access nodes and gateway connection combinations. The wireless mesh network of FIG. 1 includes first order access nodes 111, 112, 113 which are one wireless hop (link) from a gateway, and the second order access node 121 which is two wireless hops away from a gateway, and the third order access node 131 which is three wireless hops from the gateway 104.

As shown, the access node 131 selects a route to the gateway 104. As shown in FIG. 1, the present selected route is through the upstream access node 121, through a one of N available channels (Ch1, Ch2, . . . ChN). The selected route provides a routing path for routing both upstream and downstream data packets between the gateway 104 and the access node 131.

For an embodiment, the access node selects the routing path based on an estimated quality parameter of available routing paths. Once selected, the access node maintains the selected routing path. However, as previously mentioned, wireless mesh networks are subjected to a number of possible interfering signals, and signal compromising disturbances. Therefore, the most desirable routing path at any given time is likely to change. Therefore, the access node 131 should monitor other available routing paths and channel selections while operating to maintain transmission of data over the presently selected routing path and channel selection.

For an embodiment, the gateways 104 and 106 periodically transmit routing beacons (routing packets) at a constant rate. The downstream access nodes can select routing paths based on a persistence of successfully received routing packets. Further, the gateways 104, 106 can transmit the routing packets over multiple available channels. Therefore, based on the packet success rate of received routing packets, the access nodes can select routing paths and channels. However, as previously stated, the access node needs to continuously monitor the available channels due to the changing nature of the conditions of wireless channels.

For an embodiment, a channel quality estimation of an adjacent channel is based on absolute SNR values of signals of the adjacent channel. That is, an estimator function is used to predict the adjacent channel quality based on the SNR of request/response probes communicated through non-current channel neighbors (that is, adjacent channels). For this embodiment, the estimator function predicts packet success probability as a non-decreasing function of SNR. The parameters of the estimator are obtained through curve-fitting of empirically collected data. However, being specific to a particular environment as well as the spatio-temporal channel conditions, such data might not be representative of all potential configurations in real world. Further, it is well-known that many other factors apart from mere SNR influence the channel quality. As a result, the accuracy of such estimator function remains limited by all these constraints.

As an exemplary analysis of this embodiment, the following example can be considered. A mesh node is operating on channel A with success rate of $X_A$. The node has a choice of switching to channel B. Let $Y_B$ and $X_B$ be the estimated success rate and actual success rate on channel B, respectively. An estimation error of this embodiment can cause either of the following two problems. First, oscillations can occur due to over-prediction: If $Y_B > \max(X_A, X_B)$ and $Y_A > \max(X_A, X_B)$, node starts oscillating between a selection of channel A and channel B. Secondly, stickiness can occur due to under-prediction: If $Y_B < X_A < X_B$, node never switches from A to B even though channel B is better than A in reality.

Embodiments of Channel Quality Estimation

To alleviate the problems described, at least one embodiment includes channel quality estimation being performed by a comparison of the neighboring channel quality versus that in the currently operational channel. Particularly, it is assumed that the better the SNR on a specific channel, the higher is the packet success rate and vice versa. This heuristic is used as a rule of thumb to determine whether or not it is beneficial to switch over to an adjacent channel.

Channel switching is however a costly operation and involves disassociating all downstream clients to the current access node. Thus, it is crucial to accurately determine how much benefit can be gained if a channel switch takes place. To that end, depending upon the present channel quality, at least some embodiments include a conversion rate being used to predict how different the success rates on the adjacent channel would be based on the relative difference observed in the SNR values.

A key advantage to the disclosed embodiments is the use of the current channel condition as a baseline, and thus, by doing an apple-to-apple comparison, the impacts of other environmental and temporal factors are also implicitly taken into account. More precisely, this embodiment aims to predict what packet success rates would have been like on the adjacent channel if SNR was their only difference and everything else (transmission rate, interference, environmental conditions, etc.) remain unchanged. This strategy alleviates mispredictions due to shaky channel conditions and overcomes the previously mentioned oscillation and stickiness problems.

The described embodiments utilize a model for channel quality estimation that determines the rate at which packet success rate should change with every unit of SNR difference. When the channel quality is stable (regions 1 and 3 in FIG. 4), a lower rate is used. On the other hand, in a transition region (region 2 in FIG. 4), a higher rate is applied considering the fact that in that region even a small change in SNR makes a noticeable difference in packet success rates.

As shown in FIG. 1, the access node 131 of the wireless mesh network is operative to select a routing path to the gateway 104 through an upstream access node 121. For at least one embodiment, the access node (or a controller within the access node) estimates an adjacent one of a plurality of available wireless channels while the access node is communicating over a present one of the plurality of wireless channels. For at least some embodiment, the adjacent channels include communication channels to different upstream access nodes than the access node is presently communicating with. For at least some embodiments, the access node estimates the adjacent channel by determining a difference between a measured signal quality (for example, SNR) of a signal communicated over the present wireless channel and a measured signal quality of a signal communicated over the adjacent channel. Further, the access node estimates a difference between a packet success rate of the present channel and a packet success rate of the adjacent channel based on the determined difference in SNR. Finally, the access node estimates a packet success rate of the adjacent channel based on a packet success rate of the present channel and the estimated difference between the packet success rate of the present channel and the packet success rate of the adjacent channel.

Figure 2:
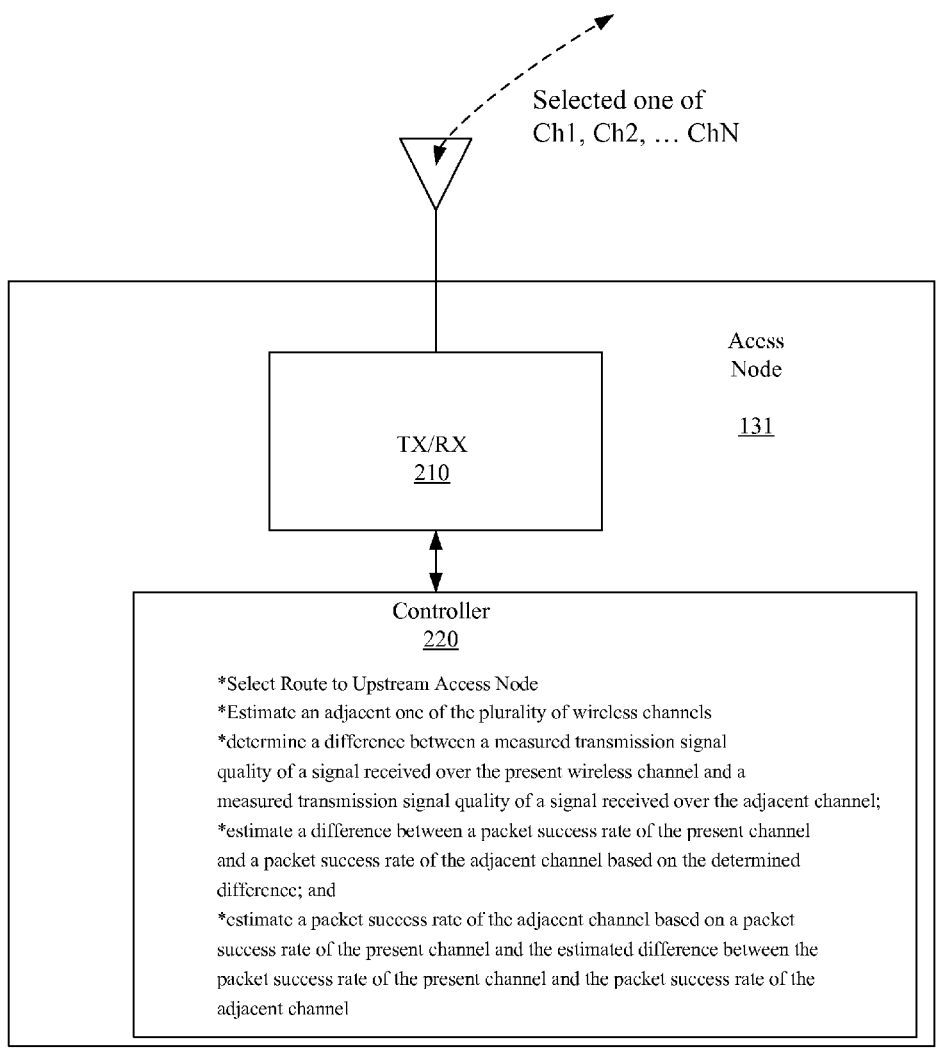
FIG. 2 shows an access node, according to an embodiment.

FIG. 2 shows an access node 131, according to an embodiment. As shown, the access node 131 includes a transceiver 210 for providing communication with upstream and/or downstream access nodes. For an embodiment, the transceiver 210 is operable to communicate over each of the available channels (Ch1, Ch2, . . . ChN) through a transceiver (TX/RX) 210. The access node 131 further includes a controller 220.

For at least some embodiments, the controller is operative to estimate an adjacent one of the plurality of wireless channels while the access node is communicating over a present one of the plurality of wireless channels. For this embodiment, the controller is operative to determine a difference between a measured signal quality of a signal communicated over the present wireless channel $(SNR_P)_M$ and a measured signal quality of a signal communicated over the adjacent channel $(SNR_A)_M$, estimate a difference between a packet success rate of the present channel and a packet success rate of the adjacent channel $(SXR_P-SXR_A)_E$ based on the determined difference in SNR, and estimate a packet success rate of the adjacent channel $(SXR_A)_E$ based on a packet success rate of the present channel $(SXR_P)$ and the estimated difference between the packet success rate of the present channel and the packet success rate of the adjacent channel $(SXR_P-SXR_A)_E$. For an embodiment, the measured signal quality is measured in terms of SNR (signal-to-noise ratio). That is the estimated packet success rate of the adjacent channel $(SXR_A)_E$ is based on $(SXR_P)-(SXR_P-SXR_A)_E$, wherein $(SXR_P-SXR_A)_E$ is determined based on $(SNR_P)_M-(SNR_A)_M$.

For at least some embodiments, determining the difference between the measured signal quality of a signal communicated over the present wireless channel and the measured signal quality of the signal communicated over the adjacent channel includes determining a difference between a measured received signal quality of a signal received over the present wireless channel and a measured signal quality of a signal received over the adjacent channel. That is, received signals are measured.

For at least some embodiments, determining the difference between the measured signal quality of a signal communicated over the present wireless channel and the measured signal quality of the signal communicated over the adjacent channel comprises determining the difference between a measured signal quality of a signal transmitted over the present wireless channel and a measured signal quality of a signal transmitted over the adjacent channel. That is, transmit signals are measured.

For at least some embodiments, determining the difference between the measured quality of a signal communicated over the present wireless channel and the measured quality of the signal communicated over the adjacent channel comprises determining a difference between a combination of measured quality of signals transmitted and received over the present wireless channel and a measured quality of signals transmitted and received over the adjacent channel. That is, the quality of both transmit and receive signals are measured and used for estimation.

For at least some embodiments, the measured signal quality includes a signal to noise ratio (SNR) of the present channel, and the adjacent channel, wherein the measured SNR of the adjacent channel is performed without disturbing communication occurring over the present channel. For an embodiment, the measurement on the adjacent channel occurs intermittently, and in a way that the present channel which is supporting upstream and downstream communication is not disturbed.

To that end, at certain time periods, the access node momentarily switches to one of the plurality of adjacent channels and broadcasts a certain number of probe request packets. Neighboring access nodes operating in that channel who are able to receive these probe requests reply back with unicast probe responses. These probe responses include information about the SNR of the received signal from the requesting access node. The requesting access node is then able to use this information along with the self-measured SNR of the probe responses to determine the overall quality of the adjacent channel under test. The whole scan process takes place at an order of a few milliseconds and the clients of the scanning access node are completely oblivious to it.

For at least some embodiments, the estimated difference between the packet success rate of the present channel and the packet success rate of the adjacent channel is determined based on an established relationship between the determined difference in the measured signal quality over the present wireless channel and the measured signal quality over the adjacent channel, and the measured packet success rate of the present channel.

For an embodiment, the measured signal quality of the adjacent channel is a combination of a transmission signal and a receive signal, or upstream signal and downstream signal.

For at least some embodiments, the measured transmission signal quality of the signals of the adjacent channel is obtained by the access node broadcasting probe signals. Further, for an embodiment, the upstream device measures the signal quality of the receive probe signals, and responds with responses that include the measured signal quality of the received probe signals. Further, the access node can measure the signal quality of the received response signals. Accordingly, the access node can base the measured transmission signal quality of the signals of the adjacent channel on the upstream signals quality, the downstream signal quality or both the upstream and downstream signal qualities.

For at least some embodiments, the difference between the packet success rate of the present channel and the packet success rate of the adjacent channel is determined based on a multiplier. For at least some embodiments, the difference between the packet success rate of the present channel and the packet success rate of the adjacent channel is determined based on a plurality of multipliers. For at least some embodiments, the plurality of multipliers includes a large multiplier and a small multiplier.

For at least some embodiments, the small multiplier is selected for determining the difference between the estimated packet success rate of the present channel and the estimated packet success rate of the adjacent channel if the packet success rate of the present wireless channel is less than a first threshold, and the measured transmission signal quality of the signal received over the adjacent channel is less than the measured transmission signal quality of the signal received over the present wireless channel. This condition is depicted by region 1 of FIG. 4.

For at least some embodiments, the small multiplier is selected for determining the difference between the estimated packet success rate of the present channel and the estimated packet success rate of the adjacent channel if the packet success rate of the present wireless channel is greater than a second threshold, and the measured transmission signal quality of the signal received over the adjacent channel is greater than the measured transmission signal quality of the signal received over the present wireless channel. This condition is depicted by region 3 of FIG. 4.

For at least some embodiments, the large multiplier is selected for determining the difference between the packet success rate of the present channel and the packet success rate of the adjacent channel if the packet success rate of the present wireless channel is greater than a first threshold and lower than a second threshold. This condition is depicted by region 2 of FIG. 4.

For at least some embodiments, an adaptive multiplier which is a weighted average of the large multiplier and the small multiple is selected for determining the difference between the packet success rate of the present channel and the packet success rate of the adjacent channel if the packet success rate of the present wireless channel is less than a first threshold, and the measured transmission signal quality of the signal received over the adjacent channel is greater than the measured transmission signal quality of the signal received over the present wireless channel. This condition is depicted by region 1 of FIG. 4.

For at least some embodiments, an adaptive multiplier which is a weighted average of the large multiplier and the small multiplier is selected for determining the difference between the packet success rate of the present channel and the packet success rate of the adjacent channel if the packet success rate of the present wireless channel is greater than a second threshold, and the measured transmission signal quality of the signal received over the adjacent channel is less than the measured transmission signal quality of the signal received over the present wireless channel. This condition is depicted by region 3 of FIG. 4.

For at least some embodiments, the access node changes operation from communication with an upstream node over the present channel to communication over the adjacent channel if the estimated packet success rate of the adjacent channel is a threshold difference better than the packet success rate over the present channel.

Figure 3:
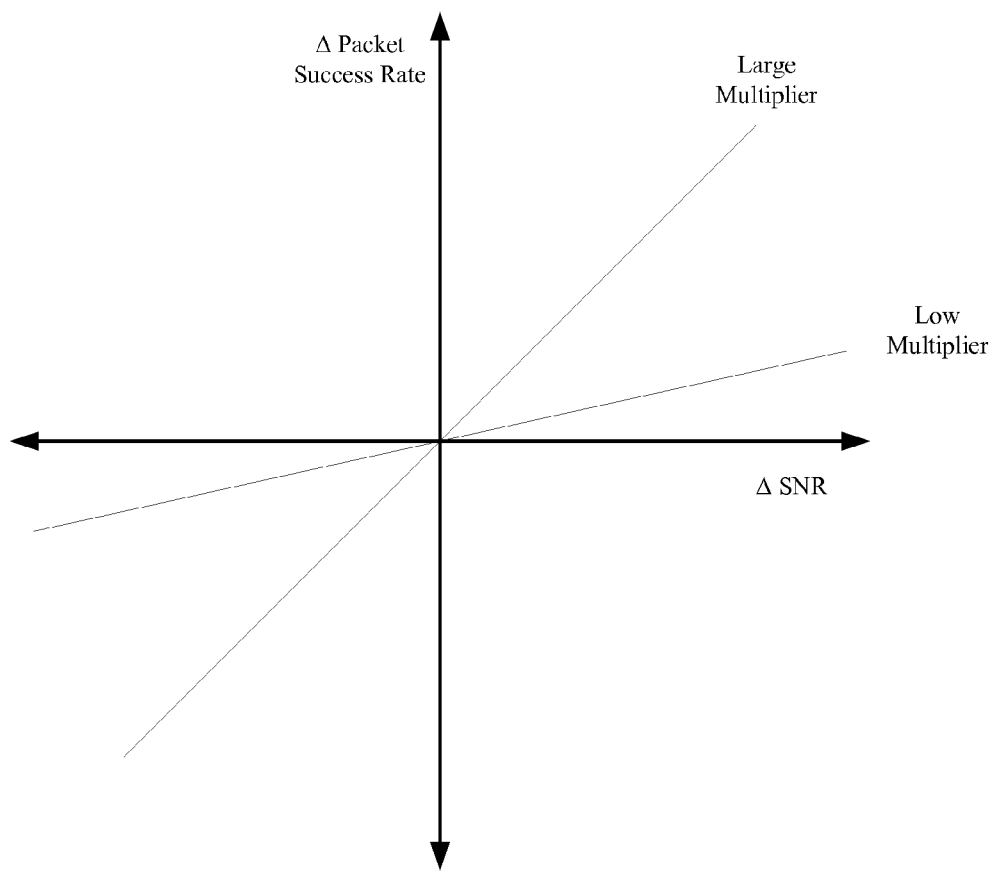
FIG. 3 shows a plot of a change in packet success rate versus change in signal-to-noise ratio (SNR) for a transmission channel of the access node, according to an embodiment.

FIG. 3 shows a plot of a change in packet success rate versus change in signal-to-noise ratio (SNR) for a communication channel of the access node, according to an embodiment. As previously stated, the access node estimates an adjacent one of a plurality of available wireless channels while the access node is communicating over a present one of the plurality of wireless channels by determining a difference between a measured signal quality of a signal communicated over the present wireless channel and a measured signal quality of a signal communicated over the adjacent channel, and estimating a difference between a packet success rate of the present channel and a packet success rate of the adjacent channel based on the determined difference.

First, the access node determines the difference between a measured signal quality of a signal communicated over the present wireless channel and a measured signal quality of a signal communicated over the adjacent channel. For an embodiment, this includes measuring the SNR over the present channel, and then measuring the SNR over the adjacent channel.

As previously described, for at least some embodiments, the measured transmission signal quality of the signals of the adjacent channel is obtained by the access node broadcasting probe signals. Further, for an embodiment, the upstream device measures the signal quality of the received probe signals, and responds with responses that include the measured signal quality of the received probe signals. Further, the access node can measure the signal quality of the received response signals. Accordingly, the access node can base the measured transmission signal quality of the signals of the adjacent channel on the upstream signals quality, the downstream signal quality or both the upstream and downstream signal qualities.

By referencing a relationship as depicted by the plot of FIG. 3, the difference between a packet success rate of the present channel and a packet success rate of the adjacent channel can be determined. As shown, for at least some embodiments, there is a large multiplier and a low multiplier. The large multiplier provides a greater difference between a packet success rate of the present channel and a packet success rate of the adjacent channel than the low multiplier.

Figure 4:
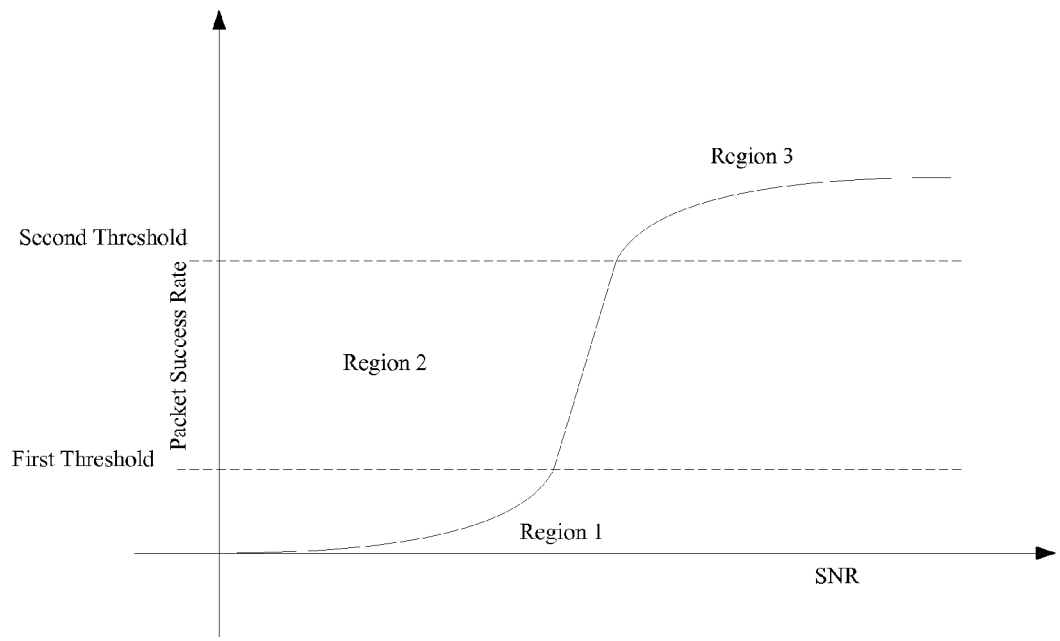
FIG. 4 shows a plot of packet success rate versus signal-to-noise ratio (SNR) for a transmission channel of the access node, according to an embodiment.

For at least some embodiments, the choice of values for low multiplier and large multiplier is determined by empirical experiments. In particular, experiments are conducted to measure what packet success rates are feasible for various ranges of SNR. For at least some embodiments, the collected information from these experiments are used to establish an approximate mapping between SNR and packet success rates as depicted in FIG. 4 and the appropriate values for low multiplier and large multiplier are determined using existing methods of curve-fitting. For at least some embodiments, experimental results of at least some environments yields values of 0.01 and 0.2 as good choices for low and large multipliers respectively that can effectively be used in a wide range of environmental settings.

For at least some embodiments, the small multiplier is selected for determining the difference between the packet success rate of the present channel and the packet success rate of the adjacent channel if the packet success rate of the present wireless channel is less than a lower threshold, and the measured transmission signal quality of the signal received over the adjacent channel is less than the measured transmission signal quality of the signal received over the present wireless channel. As previously noted, this condition is depicted by region 1 of FIG. 4.

These embodiments can be intuitive justified by considering that when the present channel quality is poor, a channel whose measured SNR is even lower can only perform marginally worse. In fact, the channel quality is considered somewhat stable below a certain threshold on packet success rates.

For at least some embodiments, the small multiplier is selected for determining the difference between the packet success rate of the present channel and the packet success rate of the adjacent channel if the packet success rate of the present wireless channel is greater than a higher threshold, and the measured transmission signal quality of the signal received over the adjacent channel is greater than the measured transmission signal quality of the signal received over the present wireless channel. As previously noted, this condition is depicted by region 3 of FIG. 4.

These embodiments can be intuitive justified by considering that when the quality of the present channel is sufficiently good, an adjacent channel with an even better SNR will only perform marginally better. In fact, the channel quality is considered somewhat stable above a certain threshold on packet success rates. Besides, when the current packet success rate is already high, it is not worth switching to a different channel even though it might give an even better quality. Using the small multiplier ensures that an access node will not leave a presently good channel unless it finds an adjacent channel with a significantly better quality (measured by SNR).

For at least some embodiments, the large multiplier is selected for determining the difference between the packet success rate of the present channel and the packet success rate of the adjacent channel if the packet success rate of the present wireless channel is greater than a lower threshold and smaller than a higher threshold. As previously noted, this condition is depicted by region 2 of FIG. 4.

In this region, even a small difference in measured SNR can result in a remarkable difference in the quality of channel in terms of packet success rates (in both directions). Therefore, a larger multiplier is used to reflect this characteristic.

For at least some embodiments, an adaptive multiplier which is a weighted average of the large multiplier and the small multiplier is selected for determining the difference between the packet success rate of the present channel and the packet success rate of the adjacent channel if the packet success rate of the present wireless channel is less than a lower threshold, and the measured quality of the signal communicated over the adjacent channel is greater than the measured quality of the signal communicated over the present wireless channel. As previously noted, this condition is depicted by region 1 of FIG. 4.

The intuition behind these embodiments is that when the packet success rate over the present channel is relatively low, a positive difference in SNR might result in a small or large improvement in packet success rate. This depends on how close the packet success rate on the present channel is to the first threshold in FIG. 4. If it is close enough that a positive difference in the measured SNR's results in a transition from region 1 to region 2 (or even region 3) of FIG. 4, then the anticipated difference in packet success rate is also large. Nonetheless, if such a transition does not take place, the resulting improvement will be marginal. The closer to the first threshold the packet success rate on the present channel and the larger the difference between the SNR of the adjacent channel and the present channel, the greater the adaptive multiplier will be. For at least some embodiments, the adaptive multiplier is not any larger than the large multiplier or any smaller than the small multiplier in FIG. 3.

For at least some embodiments, an adaptive multiplier which is a weighted average of the large multiplier and the small multiplier is selected for determining the difference between the packet success rate of the present channel and the packet success rate of the adjacent channel if the packet success rate of the present wireless channel is greater than a higher threshold, and the measured transmission signal quality of the signal received over the adjacent channel is less than the measured transmission signal quality of the signal received over the present wireless channel. As previously noted, this condition is depicted by region 3 of FIG. 4.

The intuition behind this treatment is that when the packet success rate over the present channel is high, a negative difference in SNR might result in a small or large drop in packet success rate. This depends on how close the packet success rate on the present channel is to the second threshold in FIG. 4. If it is close enough that a negative difference in the measured SNR's results in a transition from region 3 to region 2 (or even region 1) of FIG. 4, then the anticipated difference in packet success rate is also large. Nonetheless, if such a transition does not take place, the resulting decay will be slight. The closer to the second threshold the packet success rate on the present channel and the larger the difference between the SNR of the adjacent channel and the present channel, the greater the adaptive multiplier will be. For at least some embodiments, the adaptive multiplier cannot be any larger than the large multiplier or any smaller than the small multiplier in FIG. 3.

FIG. 4 shows an illustrative plot of packet success rate versus signal-to-noise ratio (SNR) for a transmission channel of the access node, according to an embodiment.

This plot depicts how various measurements of SNR map to their corresponding packet success rates on a transmission channel. It is worth mentioning that the present graph in FIG. 4 is idealized and true measurements in real environments are typically noisier than this. However, if smoothed out, the resulting graph would demonstrate a similar trend to the one depicted in FIG. 4.

As previously described, the relationship between the packet success rate versus signal-to-noise ratio (SNR) for a transmission channel of the access node generally includes three regions of region 1, region 2 and region 3. The low multiplier is selected for region 1 and region 3, and the high multiplier is selected for region 2. Also, as previously mentioned, an adaptive multiplier may also be used in regions 1 and 3 if the difference in measured SNR results in a transition between regions. First and second thresholds are established that provide logical delineation between the different regions.

Figure 5:
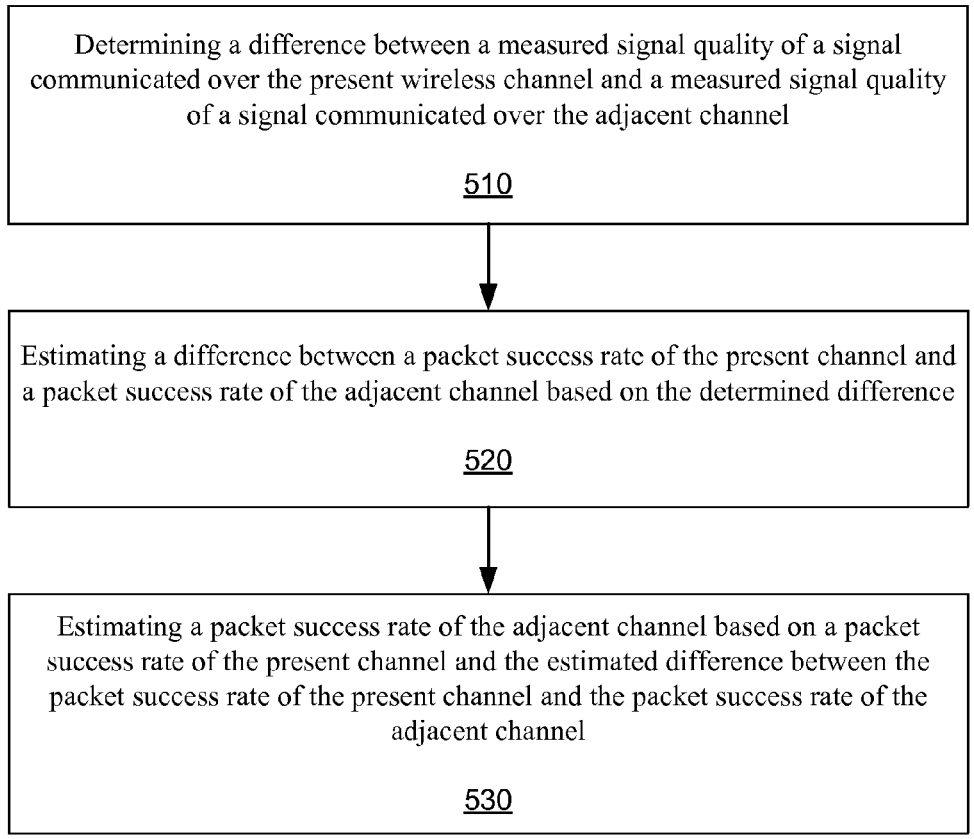
FIG. 5 is a flow chart that includes steps of a method of an access node estimating an adjacent one of the plurality of wireless channels while the access node is communicating over a present one of the plurality of wireless channels, according to an embodiment.

FIG. 5 is a flow chart that includes steps of a method of an access node estimating an adjacent one of the plurality of wireless channels while the access node is communicating over a present one of the plurality of wireless channels, according to an embodiment. A first step 510 includes determining a difference between a measured signal quality of a signal communicated over the present wireless channel and a measured signal quality of a signal communicated over the adjacent channel. A second step 520 includes estimating a difference between a packet success rate of the present channel and a packet success rate of the adjacent channel based on the determined difference. A third step 530 includes estimating a packet success rate of the adjacent channel based on a packet success rate of the present channel and the estimated difference between the packet success rate of the present channel and the packet success rate of the adjacent channel.

As previously described, for at least some embodiments, determining the difference between the signal quality of a signal communicated over the present wireless channel and the signal quality of the signal communicated over the adjacent channel comprises (1) determining a difference between a measured quality of a signal received over the present wireless channel and a measured quality of a signal received over the adjacent channel, and (2) determining a difference between a measured quality of a signal transmitted over the present wireless channel and a measured quality of a signal transmitted over the adjacent channel.

As previously described, for at least some embodiments, determining the difference between the measured signal quality of a signal communicated over the present wireless channel and the measured signal quality of the signal communicated over the adjacent channel comprises determining a difference between a combination of measured receive and transmit signal quality of signals transmitted and received over the present wireless channel and a measured signal quality of signals transmitted and received over the adjacent channel.

For at least some embodiments, the measured signal quality includes a signal to noise ratio (SNR) of the present channel, and the adjacent channel, wherein the measured SNR of the adjacent channel is performed without disturbing communication occurring over the present channel.

As previously described, for at least some embodiments, the estimated difference between the packet success rate of the present channel and the packet success rate of the adjacent channel is determined based on an established relationship between the determined difference between the measured quality of the signal communicated over the present wireless channel and the measured quality of the signal communicated over the adjacent channel, and a measured difference between the packet success rate of the present channel and the packet success rate of the adjacent channel.

For at least some embodiments, the measured transmission signal quality of the signals of the adjacent channel is obtained by the access node broadcasting probe signals. The upstream device can measure the signal quality of the receive probe signals, and respond with responses that include the measured signal quality of the received probe signals. Further, the access node can measure the signal quality of the received response signals. Accordingly, the access node can base the measured transmission signal quality of the signals of the adjacent channel on the upstream signals quality, the downstream signal quality or both the upstream and downstream signal qualities.

As previously described, for at least some embodiments, the difference between the packet success rate of the present channel and the packet success rate of the adjacent channel is determined based on a multiplier. For at least some embodiments, the difference between the packet success rate of the present channel and the packet success rate of the adjacent channel is determined based on a plurality of multipliers. For at least some embodiments, the plurality of multipliers includes a large multiplier, a small multiplier and an adaptive multiplier.

For at least some embodiments, the small multiplier is selected for determining the difference between the measured packet success rate of the present channel and the estimated packet success rate of the adjacent channel if the packet success rate of the present wireless channel is less than a first threshold, and the measured transmission signal quality of the signal received over the adjacent channel is less than the measured transmission signal quality of the signal received over the present wireless channel. As previously noted, this condition is depicted by region 1 of FIG. 4.

For at least some embodiments, the small multiplier is selected for determining the difference between the measured packet success rate of the present channel and the estimated packet success rate of the adjacent channel if the packet success rate of the present wireless channel is greater than a second threshold, and the measured transmission signal quality of the signal received over the adjacent channel is greater than the measured transmission signal quality of the signal received over the present wireless channel. As previously noted, this condition is depicted by region 3 of FIG. 4.

For at least some embodiments, the large multiplier is selected for determining the difference between the packet success rate of the present channel and the packet success rate of the adjacent channel if the packet success rate of the present wireless channel is greater than a first threshold and lower than a second threshold. As previously noted, this condition is depicted by region 2 of FIG. 4.

For at least some embodiments, an adaptive multiplier which is a weighted average of the large multiplier and the small multiple is selected for determining the difference between the packet success rate of the present channel and the packet success rate of the adjacent channel if the packet success rate of the present wireless channel is less than a threshold, and the measured transmission signal quality of the signal received over the adjacent channel is greater than the measured transmission signal quality of the signal received over the present wireless channel. As previously noted, this condition is applicable to region 1 of FIG. 4.

For at least some embodiments, an adaptive multiplier which is a weighted average of the large multiplier and the small multiplier is selected for determining the difference between the packet success rate of the present channel and the packet success rate of the adjacent channel if the packet success rate of the present wireless channel is greater than a threshold, and the measured transmission signal quality of the signal received over the adjacent channel is less than the measured transmission signal quality of the signal received over the present wireless channel. As previously noted, this condition is applicable to region 3 of FIG. 4.

For at least some embodiments, the access node changes operation from communication with an upstream node over the present channel to communication over the adjacent channel if the estimated packet success rate of the adjacent channel is a threshold difference better than the packet success rate over the present channel.

Although specific embodiments have been described and illustrated, the embodiments are not to be limited to the specific forms or arrangements of parts so described and illustrated.

What is claimed:

1. An access node, comprising:
    one or more transceivers operative to wirelessly communicate with one or more upstream access nodes or a gateway through one or more of a plurality of wireless channels;
    wherein the access node measures a signal quality of a signal communicated through a present one of the plurality of wireless channels, and the access nodes measures a signal quality of a signal communicated through an adjacent one of the plurality of wireless channels while the one or more transceivers of the access node is communicating over the present one of the plurality of wireless channels;
    a controller, the controller operative to:
        determine a difference between the measured signal quality of the signal communicated over the present wireless channel and a measured signal quality of the signal communicated over the adjacent one of the plurality of wireless channels;
        estimate a difference between a packet success rate of packets received over the present channel and a packet success rate of packets received over the adjacent one of the plurality of wireless channels based on the determined difference;
        measure a packet success rate of packets received by the transceiver over the present channel;
        estimate a packet success rate of packets received over the adjacent one of the plurality of wireless channels based on a packet success rate of packets received over the present channel and the estimated difference between the packet success rate of packets received over the present channel and the packet success rate of packets received over the adjacent one of the plurality of wireless channels;
        switch the wireless communication of the one or more transceivers to the adjacent one of the plurality of wireless channels when the estimated packet success rate of packets received over the adjacent channel is greater than the measured packet success rate of packets received over the present channel.

2. The access node of claim 1, wherein determining the difference between the measured signal quality of a signal communicated over the present wireless channel and the measured signal quality of the signal communicated over the adjacent channel comprises determining a difference between a measured receive signal quality of a signal received over the present wireless channel and a measured signal quality of a signal received over the adjacent channel.

3. The access node of claim 1, wherein determining the difference between the measured signal quality of a signal communicated over the present wireless channel and the measured signal quality of the signal communicated over the adjacent channel comprises determining the difference between a measured signal quality of a signal transmitted over the present wireless channel and a measured signal quality of a signal transmitted over the adjacent channel.

4. The access node of claim 1, wherein determining the difference between the measured signal quality of a signal communicated over the present wireless channel and the measured signal quality of the signal communicated over the adjacent channel comprises determining a difference between a combination of measured receive and transmit signal quality of signals transmitted and received over the present wireless channel and a measured signal quality of signals transmitted and received over the adjacent channel.

5. The access node of claim 1, wherein the estimated difference between the packet success rate of the present channel and the packet success rate of the adjacent channel is determined based on an established relationship between the determined difference measured transmission signal quality of the signal received over the present wireless channel and the measured transmission signal quality of the signals of the adjacent channel and a measured difference between the packet success rate of the present channel and the packet success rate of the adjacent channel.

6. The access node of claim 1, wherein the difference between the packet success rate of the present channel and the packet success rate of the adjacent channel is determined based on a multiplier.

7. The access node of claim 1, wherein the difference between the packet success rate of the present channel and the packet success rate of the adjacent channel is determined based on a plurality of multipliers.

8. The access node of claim 7, wherein the plurality of multipliers includes a large multiplier and a small multiplier.

9. The access node of claim 8, wherein the small multiplier is selected for determining the difference between the estimated packet success rate of the present channel and the estimated packet success rate of the adjacent channel if the packet success rate of the present wireless channel is less than a first threshold, and the measured transmission signal quality of the signal received over the adjacent channel is less than the measured transmission signal quality of the signal received over the present wireless channel.

10. The access node of claim 8, wherein the small multiplier is selected for determining the difference between the estimated packet success rate of the present channel and the estimated packet success rate of the adjacent channel if the packet success rate of the present wireless channel is greater than a second threshold, and the measured transmission signal quality of the signal received over the adjacent channel is greater than the measured transmission signal quality of the signal received over the present wireless channel.

11. The access node of claim 8, wherein the large multiplier is selected for determining the difference between the packet success rate of the present channel and the packet success rate of the adjacent channel if the packet success rate of the present wireless channel is greater than a first threshold and lower than a second threshold.

12. The access node of claim 8, wherein an adaptive multiplier which is a weighted average of the large multiplier and the small multiplier is selected for determining the difference between the packet success rate of the present channel and the packet success rate of the adjacent channel if the packet success rate of the present wireless channel is less than a first threshold, and the measured transmission signal quality of the signal received over the adjacent channel is greater than the measured transmission signal quality of the signal received over the present wireless channel.

13. The access node of claim 8, wherein an adaptive multiplier which is a weighted average of the large multiplier and the small multiplier is selected for determining the difference between the packet success rate of the present channel and the packet success rate of the adjacent channel if the packet success rate of the present wireless channel is greater than a second threshold, and the measured transmission signal quality of the signal received over the adjacent channel is less than the measured transmission signal quality of the signal received over the present wireless channel.

14. The access node of claim 1, wherein the access node changes operation from communication with an upstream node over the present channel to communication over the adjacent channel if the estimated packet success rate of the adjacent channel is a threshold difference better than the packet success rate over the present channel.

15. A wireless mesh network comprising:
a gateway;
a plurality of wireless access nodes, wherein each of the plurality of access nodes is operative to wirelessly communicate with one or more upstream access nodes or the gateway through one or more of a plurality of wireless channels, and wherein each access node is operative to:
measure a signal quality of a signal communicated through a present one of the plurality of wireless channels, and the access nodes measures a signal quality of a signal communicated through an adjacent one of the plurality of wireless channels while the one or more transceivers of the access node is communicating over the present one of the plurality of wireless channels;
determine a difference between the measured signal quality of the signal communicated over the present wireless channel and the measured signal quality of the signal communicated over the adjacent one of the plurality of channels;
estimate a difference between a packet success rate of packets received over the present channel and a packet success rate of packets received over the adjacent one of the plurality of wireless channels based on the determined difference;
measure a packet success rate of packets received by the transceiver over the present channel;
estimate a packet success rate of packets received over the adjacent one of the plurality of wireless channels based on a packet success rate of packets received over the present channel and the estimated difference between the packet success rate of packets received over the present channel and the packet success rate of packets received over the adjacent one of the plurality of wireless channels;
switch the wireless communication of the one or more transceivers to the adjacent one of the plurality of wireless channels when the estimated packet success rate of packets received over the adjacent channel is greater than the measured packet success rate of packets received over the present channel.

16. A method of an access node estimating signal quality of wireless signal communicated over an adjacent one of the plurality of wireless channels while the access node is communicating over a present one of the plurality of wireless channels, comprising:
wirelessly communicating, by a transceiver of the access node, with one or more access nodes or a gateway through one or more of the plurality of wireless channels;
measuring a signal quality of a signal communicated through a present one of the plurality of wireless channels;
measuring a signal quality of a signal communicated through an adjacent one of the plurality of wireless channels while the one or more transceivers of the access node is communicating over the present one of the plurality of wireless channels;
determining a difference between a measured signal quality of a signal communicated over the present wireless channel and a measured signal quality of a signal communicated over the adjacent one of the plurality of wireless channels;

estimating a difference between a packet success rate of the present channel and a packet success rate of the adjacent channel based on the determined difference;

measuring a packet success rate of packets received by the transceiver over the present channel;

estimating a packet success rate of the adjacent channel based on a packet success rate of the present channel and the estimated difference between the packet success rate of the present channel and the packet success rate of the adjacent channel; and switching the wireless communication of the one or more transceivers to the adjacent one of the plurality of wireless channels when the estimated packet success rate of the adjacent channel is greater than the measured packet success rate of the present channel.

17. The method of claim 16, wherein determining the difference between the measured signal quality of a signal communicated over the present wireless channel and the measured signal quality of the signal communicated over the adjacent channel comprises determining a difference between a measured receive signal quality of a signal received over the present wireless channel and a measured signal quality of a signal received over the adjacent channel.

18. The method of claim 16, wherein determining the difference between the measured signal quality of a signal communicated over the present wireless channel and the measured signal quality of the signal communicated over the adjacent channel comprises determining the difference between a measured signal quality of a signal transmitted over the present wireless channel and a measured signal quality of a signal transmitted over the adjacent channel.

19. The method of claim 16, wherein determining the difference between the measured signal quality of a signal communicated over the present wireless channel and the measured signal quality of the signal communicated over the adjacent channel comprises determining a difference between a combination of measured receive and transmit signal quality of signals transmitted and received over the present wireless channel and a measured signal quality of signals transmitted and received over the adjacent channel.

20. The method of claim 16, wherein the estimated difference between the packet success rate of the present channel and the packet success rate of the adjacent channel is determined based on an established relationship between the determined difference measured transmission signal quality of the signal received over the present wireless channel and the measured transmission signal quality of the signals of the adjacent channel and a measured difference between the packet success rate of the present channel and the packet success rate of the adjacent channel.

* * * * *